United States Patent
Gleich et al.

(10) Patent No.: US 8,021,588 B2
(45) Date of Patent: Sep. 20, 2011

(54) PROCESSES FOR FORMING A FIBER-REINFORCED PRODUCT

(75) Inventors: Klaus Friedrich Gleich, Highlands Ranch, CO (US); Walter Alexander Johnson, Centennial, CO (US); Raymond C. Swann, Kansas City, MO (US)

(73) Assignee: Johns Manville, Denver, CO (US)

( * ) Notice: Subject to any disclaimer, the term of this patent is extended or adjusted under 35 U.S.C. 154(b) by 0 days.

(21) Appl. No.: 12/584,212

(22) Filed: Sep. 2, 2009

(65) Prior Publication Data

US 2009/0324923 A1    Dec. 31, 2009

Related U.S. Application Data

(62) Division of application No. 11/257,366, filed on Oct. 24, 2005, now Pat. No. 7,601,282.

(51) Int. Cl.
*B29C 47/02* (2006.01)
*B29C 47/04* (2006.01)

(52) U.S. Cl. .................................... 264/257; 264/112

(58) Field of Classification Search .................. None
See application file for complete search history.

(56) References Cited

U.S. PATENT DOCUMENTS

| | | | | |
|---|---|---|---|---|
| 3,894,134 A | * | 7/1975 | Williams | 264/112 |
| 4,844,968 A | * | 7/1989 | Persson et al. | 428/181 |
| 5,134,026 A | * | 7/1992 | Melcher | 428/326 |
| 5,540,875 A | * | 7/1996 | Rubio | 264/463 |
| 5,641,366 A | * | 6/1997 | Hohman | 156/62.8 |
| 5,743,985 A | * | 4/1998 | Ernest et al. | 156/243 |
| 5,759,463 A | * | 6/1998 | Chang | 264/112 |
| 5,888,913 A | * | 3/1999 | Penz et al. | 442/180 |
| 6,485,667 B1 | * | 11/2002 | Tan | 264/510 |

* cited by examiner

*Primary Examiner* — Mary F Theisen
(74) *Attorney, Agent, or Firm* — Robert D. Touslee

(57) ABSTRACT

A process for forming a reinforced product suitable for use as a roofing material is provided, comprising: (a) providing a composition comprising a matrix material; and (b) extruding the composition with an extruder to form a reinforced product, wherein a plurality of fibers is combined with the matrix material prior to or during the extrusion step. Also provided is a process for forming a reinforced product suitable for use as a roofing material, comprising: (a) forming a first layer comprising a first matrix material; (b) providing a plurality of fibers on the first layer; (c) forming a second layer comprising a second matrix material, above the plurality of fibers; and (d) combining the plurality of fibers with the first matrix material and/or the second matrix material, to form a reinforced product.

6 Claims, No Drawings

PROCESSES FOR FORMING A FIBER-REINFORCED PRODUCT

BACKGROUND

This application is a division of application Ser. No. 11/257,366, filed Oct. 24, 2005 now U.S. Pat. No. 7,601,282.

Structurally reinforced products can be used in a variety of applications including, for example, roofing applications in residential and commercial buildings. Conventional processes for forming such reinforced roofing materials are somewhat inflexible. Typically, various parameters of such conventional processes are restricted, and varying such process conditions can be problematic or even impossible. For example, conventional processes typically do not provide ample flexibility in varying the overall compositions of the polymeric materials so reinforced, as well as reinforced products formed therefrom. In addition, conventional processes typically require relatively large quantities of material for processing in order to be economically feasible, and this can in turn require the use of large pieces of process equipment and excessive energy to accommodate the processing of such materials. Furthermore, conventional processes typically require the combination of a matrix and a fiber structure wherein a matrix is formed by one process, and reinforcing material is preformed by a separate process into a preliminary structure. The use of such conventional processes generally leads to decreased efficiency and increased manufacture cost.

SUMMARY

According to one aspect, a process for forming a reinforced product suitable for use as a roofing material is provided, comprising:
(a) providing a composition comprising a matrix material; and
(b) extruding the composition with an extruder to form a reinforced product,
wherein a plurality of fibers is combined with the matrix material prior to or during the extrusion step.

According to another aspect, a process for forming a reinforced product suitable for use as a roofing material is provided, comprising:
(a) forming a first layer comprising a first matrix material;
(b) providing a plurality of fibers on the first layer;
(c) forming a second layer comprising a second matrix material, above the plurality of fibers; and
(d) combining the plurality of fibers with the first matrix material and/or the second matrix material, to form a reinforced product.

According to another aspect, a process for forming a plurality of precursor particles suitable for use in a process for forming a reinforced product is provided, comprising:
(a) providing at least one continuous fiber;
(b) at least partially coating the at least one continuous fiber with a matrix material; and
(c) dividing the at least partially coated continuous fiber to form a plurality of precursor particles.

According to another aspect, a process for forming a reinforced product from a plurality of precursor particles is provided, wherein each precursor particle comprises a fiber at least partially coated with a matrix material, the process comprising:
(a) heating the plurality of precursor particles under conditions effective to at least partially melt the matrix material, thereby producing a heated material; and
(b) introducing the heated material to a surface on which the reinforced product is formed.

DETAILED DESCRIPTION

The process for forming the reinforced product employs a matrix material that can be selected based on the intended application of the reinforced product, the specific fabrication process that is employed, and/or the desired characteristics and properties of the product. For example, the matrix material can include a polymeric material such as a thermoplastic or a thermosetting material. The matrix material can be formed from bitumen, polymer-modified bitumen, resins, rubbers and plastics such as polyvinyl chloride (PVC), thermoplastic olefin (TPO), polyethylene, polypropylene, ethylene propylene diene monomer (EPDM) and polymers thereof, polyester, polyurethane, polyisocyanurate, propylene-ethylene-copolymer and a mixture thereof. Examples of a propylene-ethylene-copolymer which can be used are available from Montell Polyolefins under the trade names "ASTRYN" and "ADFLEX". For roofing applications, the matrix material preferably can at least include bitumen or a polymer-modified bitumen.

The polymer-modified bitumen contains at least one polymer for imparting desirable characteristics to the reinforced product. For example, a polymer additive can be used to improve various characteristics of the reinforced product such as, for example, the thermal response, structural flexibility, ageing characteristics, and/or adhesion characteristics of the reinforced product. The polymer used to modify the bitumen can include, for example, styrene butadiene styrene rubber, amorphous-poly-alpha olefins (APAOs), isotactic polypropylene or a mixture thereof. The polymer additive used to modify the bitumen can be present in any effective amount.

The amount of the matrix material can depend on, for example, the intended application of the product, the specific fabrication process employed, and/or the desired characteristics and properties of the product. The matrix material is present in an amount which enables processing of the material by at least one of the fabrication processes described below. For example, the matrix material can be present in an amount of at least about 25%, more preferably from about 50% to about 99%, based on the weight of the reinforced product.

The reinforced product can also be formed from an inorganic filler. The amount and type of inorganic filler can depend on the desired characteristics and properties of the reinforced product. For example, the inorganic filler can be present in an amount from 0% to about 50%, more preferably from about 15% to about 40%, based on the weight of the reinforced product.

The reinforced product includes a plurality of fibers for providing structural reinforcement. While not wishing to be bound by any particular theory, it is believed that fibers which are excessively short do not adequately contribute to the structural reinforcement of the product. Accordingly, the present fibers have dimensions which enable them to provide structural reinforcement to the matrix material. For example, the fibers present in the reinforced product can have an average length of about 250 mm or less, more preferably about 50 mm or less, and most preferably from about 15 mm to about 38 mm. The fibers are preferably discontinuous as a result of the use thereof in one of the processes described below.

The fibers can be of a material that is effective to provide structural reinforcement, and the specific material used can depend on the fabrication method employed, the specific application of the product, and/or the desired characteristics and properties of the product. For example, the plurality of fibers can comprise glass fibers, natural fibers, polymer fibers such as polyester fibers, or a mixture thereof. In a preferred embodiment, the reinforced product includes glass fibers.

The fibers are present in an amount that is effective to provide structural reinforcement. For example, the fibers can be present in an amount of from about 1% to about 49%, preferably from about 1% to about 15%, based on the weight of the reinforced product.

The shape of the fibers is not particularly limited, and the fibers can be substantially regularly or irregularly shaped. In an exemplary embodiment, fiber waste material can be used such as, for example, "basement fibers" which can be collected from below the floor level of a forming room in a fiber production facility. In embodiments where discontinuous fibers are initially used as the starting material, the average length of the discontinuous fibers in the reinforced product is preferably at least about 70% to about 80% of the average initial length of such fibers. In embodiments where continuous fibers are initially used as the starting material, such continuous fibers are subjected to an increased degree of breakage in comparison with the use of discontinuous fibers.

The discontinuous fibers can be distributed in the matrix material in any suitable manner for providing structural reinforcement, for example, in a substantially homogenous distribution. The distribution of the fibers in the matrix material can depend on the specific fabrication process employed, and various parameters of the processes can be adjusted to achieve varying degrees of distribution of the fibers.

In a first exemplary process for forming the reinforced product, an extrusion composition is provided which includes the matrix material. A plurality of fibers is combined with the matrix material prior to or during the extrusion step. The plurality of fiber can be combined with the matrix material in any suitable manner. The material provided to the extruder can contain all of the components of the extrusion composition, or an initial material can be provided to the extruder and additional components can be added during the extrusion process. In an exemplary embodiment, discrete components of the matrix can be introduced into an extruder which forms a suitable compound for combination with the fibers, and the fibers can then be combined therewith during extrusion.

The portion of the extrusion process in which the fibers are introduced and/or are present is preferably conducted under relatively low-shear conditions, for example, so as to reduce or avoid breakage of the fibers. The extrusion step is preferably conducted under conditions which enable "wet out" of the extruded material, i.e., the fibers and any other solid materials present in extrusion composition are sufficiently coated and dispersed in the extruded material.

Any extrusion apparatus capable of extruding the extrusion composition can be used. While not wishing to be bound to any particular theory, it is believed that maintaining a relatively long fiber length in the extruded material can increase the structural reinforcing effect of such fibers. The dimensions of the extrusion apparatus preferably enable the extrusion composition to be extruded under low-shear conditions, so as to reduce the degree of breakage of the fibers as described above. For example, the extrusion apparatus can be a single-screw or twin-screw apparatus. In an exemplary embodiment, the extrusion apparatus can have a diameter of at least about 50 mm, and the length-to-diameter (L to D) ratio can be at least about 40, more preferably from about 40 to about 50. An exemplary extrusion apparatus that can be used is available from Leistritz located in Nuerenberg, Germany.

In a second exemplary process for forming the reinforced product, a first layer comprising a first matrix material is formed. The first matrix material can be selected from the matrix materials described above. Preferably, the process can be conducted as a continuous process by, for example, providing the first layer on a conveyor belt. Any suitable process for forming a layer from the matrix material can be used such as, for example, an extrusion process. The dimensions of the first layer are not particularly limited, and can depend on, for example, the specific application of the reinforced product.

A plurality of fibers can then be provided on the first layer. The plurality of fibers can be provided as discontinuous fibers that are not bound together. For example, the discontinuous fibers can be substantially free of a binder that is typically used in the formation of fiber glass mats. Any suitable means for providing the fibers to the first layer can be used such as, for example, a fiber feeder apparatus available from Brabender Technologie Inc., located in Ontario, Canada. For example, the fiber feeder apparatus can be positioned above the first layer and substantially continuously deposit the fibers onto the first layer as such layer is conveyed under the fiber feeder apparatus.

A second layer comprising a second matrix material can be formed above the plurality of fibers. The second matrix material can be selected from the matrix materials described above, and can be the same as or different from the first matrix material of the first layer. The second layer can be formed by any suitable process such as, for example, an extrusion process. Optionally, an additional step of providing a plurality of fibers and/or an additional step of forming a layer of matrix material can be conducted.

The plurality of fibers can then be introduced into the first matrix material and/or the second matrix material. For example, the fibers can be introduced to the matrix material by applying force to the first layer and/or the second layer. Any suitable means for applying force to either or both of the first and second layers can be used. For example, the layers can be passed between an upper roller positioned above the layers and a lower roller positioned below the layers, wherein the distance between the rollers is less than overall thickness of the layers.

While the reinforced product is produced by forming layers in separate steps, the first and second layers can substantially blend into each other in the final reinforced product. That is, the reinforced product can contain either distinct and/or indistinct layers of material.

Also provided is a process for forming a plurality of precursor particles suitable for use in a process for forming a reinforced product. That is, the precursor particles can be employed in a process for forming a reinforced product. The process for forming the precursor particles includes providing at least one continuous fiber, and preferably a plurality of continuous fibers. The at least one continuous fiber can be formed using any suitable means including, for example, by extrusion. The plurality of fibers can comprise glass fibers, hemp fibers, wood fibers, polymer fibers such as polyester fibers or a mixture thereof. In a preferred embodiment, the particles are at least formed from glass fibers.

The at least one continuous fiber is at least partially coated with a matrix material using any suitable means, and preferably the outer surface of the at least one continuous fiber is substantially entirely coated with the matrix material. The matrix material can be at least partially melted and applied to the fiber using a continuous melter, an extruder and/or a melt pump. The matrix material can be cooled and the resulting coated fiber can be provided as a final product or divided into smaller segments to form precursor particles for forming a reinforced product. The coated fiber can be divided using any suitable device such as a conventional fiber chopping apparatus. The segments can have any suitable length. For example, the segments can be divided such that the precursor particles have an average particle size of from about 12 mm to about 25 mm. The shape of the precursor particles is not particularly limited, and such particles can have cylindrical, spherical or asymmetrical shapes.

A process for forming a reinforced product using the above-described precursor particles is also provided. The precursor particles can be heated under conditions effective to at least partially melt the matrix material, thereby producing a heated material. The heated material can then be introduced to a surface on which the reinforced product is formed. Any suitable means for applying the heated material can be used such as, for example, a spraying process or coating process, and preferably a spraying process. Applying the heated material by spraying or coating can facilitate installation in irregularly shaped areas and/or areas in which installation would otherwise be difficult or inconvenient. In addition, transporting and/or storing the precursor particles can be a more convenient alternative in comparison with transporting/storing conventional products in finished form.

The reinforced product can include at least one additional layer depending on the particular application of the product. For example, the reinforced product can include a clean-bond layer, a cover material, a decorative sheet, an insulation layer and/or a foam layer.

The dimensions and physical characteristics of the reinforced product can depend on the specific intended application of the product. For example, the reinforced product can be provided in the form of an elongated sheet. Preferably, the elongated sheet can be rolled to facilitate storage and transport of the material. The dimensions of the elongated sheet are not particularly limited and can depend on the specific application of the sheet.

The reinforced product can be used in various applications such as, for example, roofing applications for residential and/or commercial buildings. In an exemplary embodiment, the reinforced product can be used in combination with conventional reinforcement materials such as mats formed from fiberglass and/or polyester.

While a detailed description of specific exemplary embodiments has been provided, it will be apparent to one of ordinary skill in the art that various changes and modification can be made, and equivalents employed without departing from the scope of the claims.

What is claimed is:

1. A process for forming a reinforced product suitable for use as a roofing material, comprising:
   (a) forming a first layer comprising a first matrix material comprised of bitumen or a polymer-modified bitumen;
   (b) providing a plurality of fibers on the first layer;
   (c) forming a second layer comprising a second matrix material comprised of bitumen or a polymer-modified bitumen, above the plurality of fibers; and
   (d) combining the plurality of fibers with the first matrix material and/or the second matrix material, to form a reinforced product,
   wherein the first layer and the second layer are formed by an extrusion process and the plurality of fibers is present in an amount of from about 1% to about 49% based on the weight of the reinforced product.

2. The process for forming a reinforced product according to claim 1, wherein the step (d) comprises applying force to the first layer and/or the second layer.

3. The process for forming a reinforced product according to claim 1, wherein the plurality of fibers comprises glass fibers; natural fibers, polymer fibers or a mixture thereof.

4. The process for forming a reinforced product according to claim 1, wherein the average length of the plurality of fibers present in the reinforced product is about 50 mm or less.

5. The process for forming a reinforced product according to claim 1, wherein the total amount of the first and second matrix materials is from about 50% to about 99%, based on the weight of the reinforced product.

6. The process for forming a reinforced product according to claim 1, wherein an inorganic filler is present in an amount from about 1% to about 40%, based on the weight of the reinforced product.

* * * * *